(12) United States Patent
Harada et al.

(10) Patent No.: US 8,199,133 B2
(45) Date of Patent: Jun. 12, 2012

(54) WRITING DEVICE

(75) Inventors: Haruo Harada, Ebina (JP); Chisato Urano, Ebina (JP); Hiroshi Arisawa, Ebina (JP); Yasunori Okano, Tokyo (JP); Taijyu Gan, Ebina (JP); Takashi Morikawa, Ebina (JP); Atsushi Hirano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 576 days.

(21) Appl. No.: 12/494,920

(22) Filed: Jun. 30, 2009

(65) Prior Publication Data

US 2010/0243341 A1 Sep. 30, 2010

(30) Foreign Application Priority Data

Mar. 26, 2009 (JP) ................................. 2009-077583

(51) Int. Cl.
*G09G 3/22* (2006.01)
(52) U.S. Cl. ..................... 345/183; 178/18.06
(58) Field of Classification Search .................. 345/173, 345/182–183; 178/18.06
See application file for complete search history.

(56) References Cited

U.S. PATENT DOCUMENTS

| | | | |
|---|---|---|---|
| 2004/0119933 A1 | 6/2004 | Harada et al. | |
| 2005/0174259 A1* | 8/2005 | Ely | 341/5 |
| 2006/0029250 A1* | 2/2006 | Karaki | 382/100 |
| 2007/0046595 A1 | 3/2007 | Gan et al. | |
| 2008/0150918 A1* | 6/2008 | Hagen et al. | 345/179 |
| 2008/0158165 A1* | 7/2008 | Geaghan et al. | 345/173 |
| 2008/0204429 A1* | 8/2008 | Silverbrook et al. | 345/179 |

FOREIGN PATENT DOCUMENTS

| | | |
|---|---|---|
| JP | A-11-149088 | 6/1999 |
| JP | A-11-237644 | 8/1999 |
| JP | A-2004-198949 | 7/2004 |
| JP | A-2007-057630 | 3/2007 |

OTHER PUBLICATIONS

Japanese Office Action issued in Application No. 2009-077583; Dated Mar. 8, 2011 (With Translation).

* cited by examiner

*Primary Examiner* — Kevin M Nguyen
*Assistant Examiner* — Sepideh Ghafari
(74) *Attorney, Agent, or Firm* — Oliff & Berridge, PLC (57) ABSTRACT

A writing device includes: a display medium including: a first display layer; a second display layer stacked on the first display layer; a first conductive layer and a second conductive layer sandwiching the first display layer and the second display layer; and a photosensitive layer located between the first conductive layer and the second conductive layer; a voltage-applying unit that applies a bias voltage to the first conductive layer and the second conductive layer, a frequency of the bias voltage differing between a case in which a state of the first display layer and a state of the second display layer are changed simultaneously, and a case in which a state of the first display layer and a state of the second display layer are changed separately; and a light outputting unit that irradiates light to the display medium.

7 Claims, 10 Drawing Sheets

FIG. 10A  $f\tau = 0.01$

FIG. 10B  $f\tau = 0.05$

FIG. 10D  $f\tau = 0.5$

FIG. 10E  $f\tau = 1$

FIG. 10C  $f\tau = 0.1$

WRITING DEVICE

CROSS-REFERENCE TO RELATED APPLICATIONS

This application is based on and claims priority under 35 USC 119 from Japanese Patent Application No. 2009-077583 filed on Mar. 26, 2009.

BACKGROUND

Technical Field

The present invention relates to a writing device.

SUMMARY

An aspect of the present invention provides a writing device including: a display medium including: a first display layer in which if a pulse voltage is applied to a part of the first display layer, a state of the part changes to a reflective state in which the part reflects light of a first wavelength of outside light or a light transmissive state in which the part transmits light of the first wavelength of outside light, depending on a value of the pulse voltage; a second display layer stacked on the first display layer, in which if a pulse voltage is applied to a part of the second display layer, a state of the part changes to a reflective state in which the part reflects light of a second wavelength, which is different from the first wavelength, of outside light or a light transmissive state in which the part transmits light of the second wavelength of outside light, depending on a value of the pulse voltage; a first conductive layer and a second conductive layer sandwiching the first display layer and the second display layer, to which a bias voltage is applied from outside; and a photosensitive layer located between the first conductive layer and the second conductive layer such that upon irradiation of the photosensitive layer with light a value of a pulse voltage applied to the first display layer and the second display layer increases, wherein: a value of a pulse voltage for changing a state of the first display layer is different from a value of a pulse voltage for changing a state of the second display layer; a ratio of a pulse voltage applied to the first display layer via the first conductive layer and the second conductive layer and a pulse voltage applied to the second display layer via the first conductive layer and the second conductive layer changes depending a frequency of a bias voltage applied to the first conductive layer and the second conductive layer; and a value of a pulse voltage for changing a state of the first display layer and a value of a pulse voltage for changing a state of the second display layer change depending on a frequency of a bias voltage applied to the first conductive layer and the second conductive layer; a voltage-applying unit that applies a bias voltage to the first conductive layer and the second conductive layer, a frequency of the bias voltage differing between a case in which a state of the first display layer and a state of the second display layer are changed simultaneously, and a case in which a state of the first display layer and a state of the second display layer are changed separately; and a light outputting unit that irradiates light to the display medium.

BRIEF DESCRIPTION OF THE DRAWINGS

Exemplary embodiments of the present invention will now be described in detail below with reference to the following figures, wherein.

DETAILED DESCRIPTION

[Exemplary Embodiment]

Figure 1:
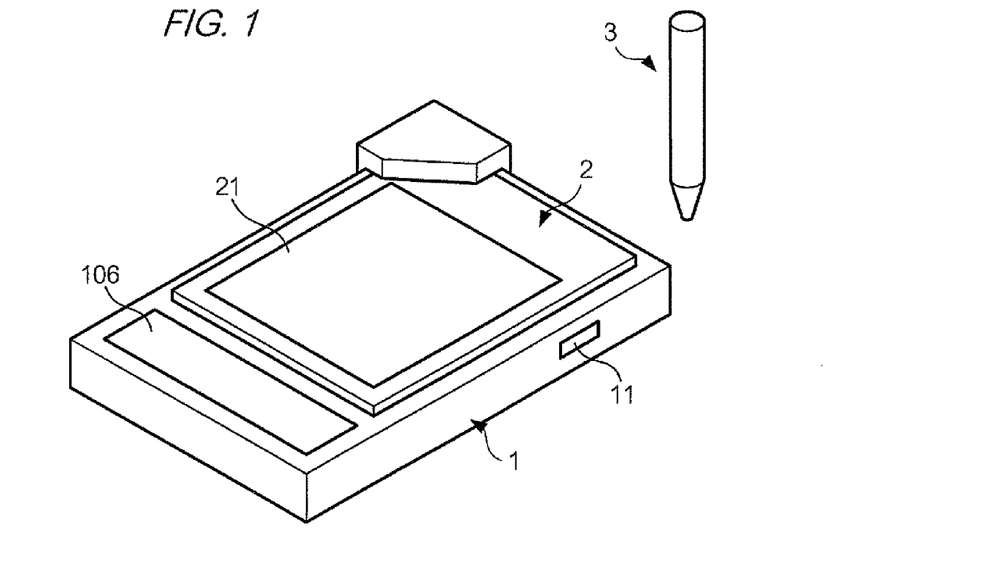
FIG. 1 is a diagram showing an external view of a device according to an exemplary embodiment of the present invention.

FIG. 1 is a diagram showing a frame format of an external view of writing device 1, display device 2, and writing instrument 3 according to an exemplary embodiment of the present invention.

Display device 2 is a reflective display device that displays an image by reflecting outside light such as light of a lighting apparatus or sunlight. Display device 2 has a rectangular and plate-like form, and includes display medium 21 formed of a stack of: a display layer including a cholesteric liquid crystal; a photosensitive layer that generates charges in response to light; and a conductive layer that sandwiches the display layer and the photosensitive layer.

In display device 2, if light is irradiated by writing device 1 while a voltage is applied to a conductive layer, an orientational state of an irradiated cholesteric liquid crystal changes so that a display layer is divided into a part transmissive of outside light and a part reflective to outside light, and as a result, a color image is displayed.

Writing instrument 3 is a stylus pen, which is an input device used to specify a part of display medium 21 in which a display is to be changed. A tip of writing instrument 3 is designed to be used in contact with a surface of display medium 21, and is rounded so as not to scratch the display surface.

Writing device 1 is a device for writing an image in display device 2 to cause it to display the image. Writing device 1 has terminals electrically connected to conductive layers of display device 2, and a device for irradiating light to display medium 21. Writing device 1 causes display device 2 to display an image by applying a voltage to the conductive layers of display medium 21 via the terminals and irradiating light to display device 2.

(Configuration of Display Device 2)

Figure 2:
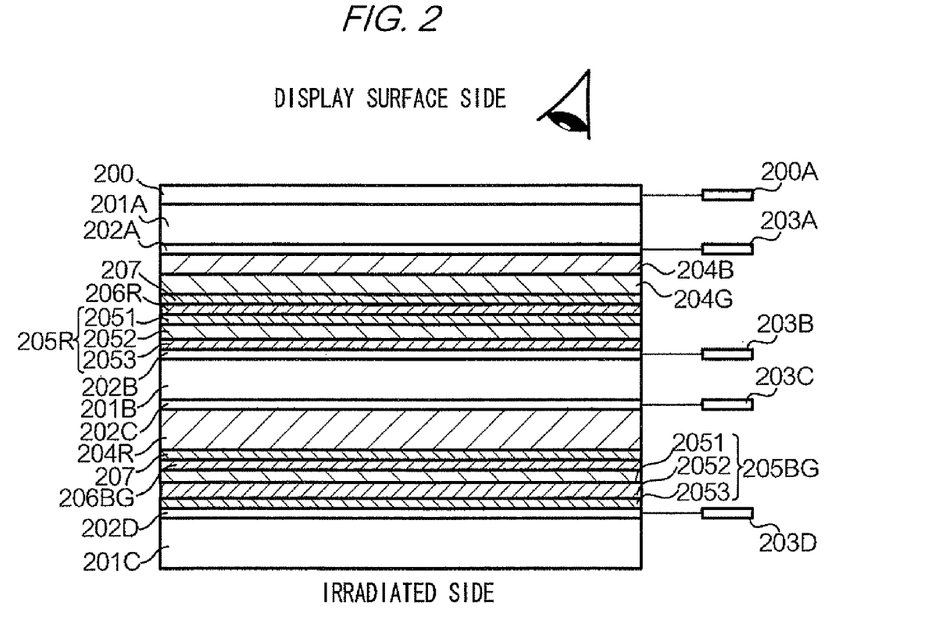
FIG. 2 is a diagram showing a frame format of a section of display medium 21.

FIG. 2 is a diagram showing a frame format of a section of display medium 21 of display device 2. Display medium 21 is formed of a stack of substrate layers, conductive layers, display layers, colored layers, photosensitive layers, and laminate layers. Each layer has a rectangular form. On a surface of display medium 21, touch panel 200 is provided. In FIG. 2, the side at which touch panel 200 is provided is a side at which an image is viewed by a user (display surface side), and the side at which substrate layer 201C is provided is a side onto which light is irradiated by writing device 1 (irradiated side).

Light-transmissive touch panel 200 is a position input device and if an object comes into contact with a surface of the panel, a positional signal is output indicating a point of contact. Touch panel 200 is connected to terminal 200A for outputting the positional signal. If the tip of writing instrument 3 comes into contact with the surface of touch panel 200, a positional signal indicating the point of contact at the surface is output by terminal 200A.

Substrate layers 201A, 201B, and 201C are layers that protect a part for displaying an image and retain a physical form of the part. Substrate layer 201A is in contact with the irradiated side of touch panel 200. Substrate layer 201C is exposed at the irradiated side of display device 2. Substrate layer 201B is located between conductive layer 202B and conductive layer 202C, and isolates these layers from each other. In the present exemplary embodiment, each substrate layer is made of transparent polyethylene terephthalate. However, another material may be used for the substrate layers so long as the material is transparent and is not electrically conductive.

Conductive layers 202A, 202B, 202C, and 202D are made of indium tin oxide in the present exemplary embodiment, and these layers are light transmissive and electrically conductive. However, another material may be used for the conductive layers so long as the material is light transmissive in addition to being electrically conductive.

Among the conductive layers, conductive layer 202A is in contact with the irradiated side of substrate layer 201A; conductive layer 202B is in contact with the display surface side of substrate layer 201B; conductive layer 202C is in contact with the irradiated side of substrate layer 201B; conductive layer 202D is in contact with the display surface side of substrate layer 201C; conductive layer 202A is connected to terminal 203A; conductive layer 202B is connected to terminal 203B; conductive layer 202C is connected to terminal 203C; and conductive layer 202D is connected to terminal 203D. Terminals 203A to 203D are terminals to which a voltage is applied, and are exposed.

Among the display layers, display layer 204B is in contact with the irradiated side of conductive layer 202A; display layer 204G is in contact with the irradiated side of display layer 204B; display layer 204R is in contact with the irradiated side of conductive layer 202C. Each of these layers is made up of plural materials, such as a cholesteric liquid crystal and a light-transmissive resin, with the cholesteric liquid crystal being dispersed in the resin.

In the cholesteric liquid crystal, liquid crystal molecules are helically-oriented, and when exposed to an electrical field their orientation state changes to one that reflects light of a particular wavelength of incident light or to one that transmits light of a particular wavelength of incident light. In the present exemplary embodiment, the cholesteric liquid crystal of display layer 204B is adjusted to reflect blue light (light of a wavelength ranging from 400 nm to 500 nm); the cholesteric liquid crystal of display layer 204G is adjusted to reflect green light (light of a wavelength ranging from 500 nm to 600 nm); and the cholesteric liquid crystal of display layer 204R is adjusted to reflect red light (light of a wavelength ranging from 600 nm to 700 nm). However, light reflected by each of the display layers is not limited to the above examples. A material for cholesteric liquid crystals may be selected such that the cholesteric liquid crystal of each display layer reflects light of a predetermined particular wavelength.

Resin used in each display layer functions to retain a cholesteric liquid crystal and to restrain a flow of the liquid crystal (change of an image). The resin is a polymeric material that is not soluble in a material of the liquid crystal, and contains a liquid that does not act as a solvent to the liquid crystal. Also, a resin used in each display layer has sufficient strength to withstand an external impact; and, as stated above, is light transmissive.

Photosensitive layer 205R, which is in contact with the display surface side of conductive layer 202B, and photosensitive layer 205BG, which is in contact with the display surface of conductive layer 202D have photoelectric properties. In the present exemplary embodiment, each layer has charge-generating layers 2051 and 2053, and charge-transporting layer 2052. The layers are stacked in the following order: charge-generating layer 2051, charge-transporting layer 2052, and charge-generating layer 2053.

If light is irradiated to a photosensitive layer, a resistance value of the irradiated part decreases. A voltage applied to a conductive layer sandwiching a display layer and a photosensitive layer is divided between the display layer and the photosensitive layer. If a resistance value of the photosensitive layer decreases, a rate at which the voltage divides also changes whereby an amount of a voltage applied to the display layer increases.

Charge-generating layers 2051 and 2053 are layers that absorb light to generate photocarriers. Charge-generating layer 2051 controls an amount of photocarriers flowing from a conductive layer at the display surface side to a conductive layer at the irradiated side; while charge-generating layer 2053 controls the amount of photocarriers flowing from the conductive layer at the irradiated side to the conductive layer at the display surface side.

Charge transporting layer 2052 is a layer to which photocarriers generated in each charge-generating layer are injected, and this transporting layer drifts in a direction of an electrical field generated by a voltage applied to conductive layers.

In the present exemplary embodiment, charge-generating layers of photosensitive layer 205R include a red charge-generating material (e.g., dibromoanthoanthrone) that absorbs blue to green light; and charge-generating layers of photosensitive layer 205BG include blue and green charge-generating materials (e.g., titanyl phthalocyanine) that absorb red light.

Colored layer 206R in contact with the display surface side of photosensitive layer 205R is a layer for absorbing light of the same wavelength as that absorbed by a charge-generating layer of photosensitive layer 205R; while colored layer 206R is colored a complementary color of light reflected by display layers 204B and 204G by use of an organic or inorganic pigment, or an organic dye.

Colored layer 206BG in contact with the display surface side of photosensitive layer 205BG is a layer for absorbing light of the same wavelength as that absorbed by a charge-generating layer of photosensitive layer 205BG; and colored layer 206BG is colored a complementary color of light reflected by display layer 204R, by use of an organic or inorganic pigment, or an organic dye.

Laminate layers 207 located between colored layer 206R and display layer 204G, and between colored layer 206BG and display layer 204R are provided to absorb concavity and convexity between a display layer and a colored layer, and to cause the two layers to adhere together. Laminate layers 207 may be made of a polymeric material with a low glass transition point so that a display layer and a photosensitive layer can be adhered together by heat or pressure. Laminate layers 207 are transmissive to incident light.

Material of laminate layers 207 may include adhesive polymeric materials such as a polyurethane resin, epoxy resin, acrylate resin, or silicone resin.

In display medium 21 in which the above-mentioned layers are stacked, if the initial state of a cholesteric liquid crystal of a display layer prior to application of a voltage is a planar phase, the phase of the cholesteric liquid crystal changes with an increase in a voltage in the following order: a planar phase, a focal conic phase, and a homeotropic phase. If the initial sate is a focal conic phase, the phase of the cholesteric liquid crystal changes with an increase in a voltage in the following order: a focal conic phase and a homeotropic phase.

If application of a voltage is stopped while the cholesteric liquid crystal is in a focal conic phase, the cholesteric liquid crystal maintains the focal conic phase. If application of a voltage is stopped while the cholesteric liquid crystal is in a homeotropic phase, the phase of the cholesteric liquid crystal changes from the homeotropic phase to a planar phase, and the cholesteric liquid crystal maintains the planar phase.

Figure 3A:
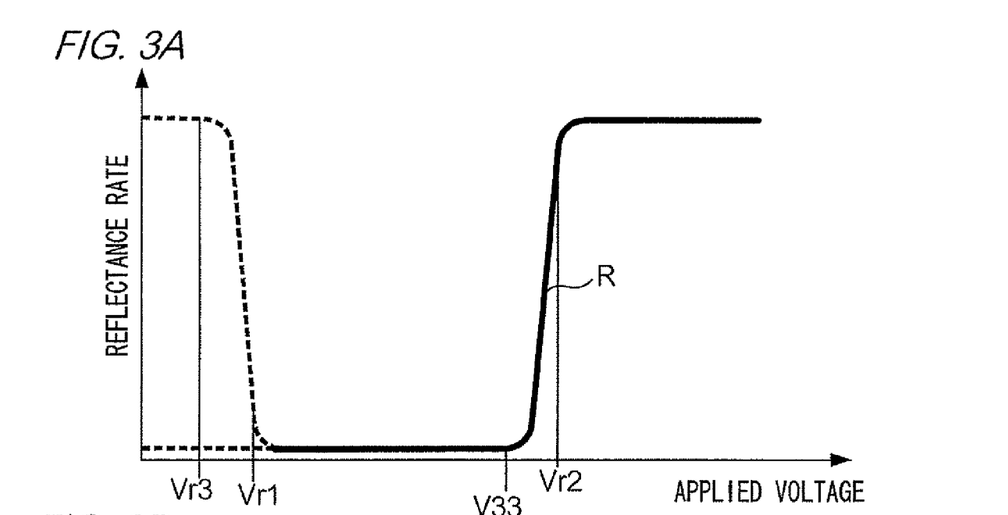
FIGS. 3A and 3B are diagrams showing a relation between a voltage applied to a display layer and a reflectance ratio of the display layer.
Figure 3B:
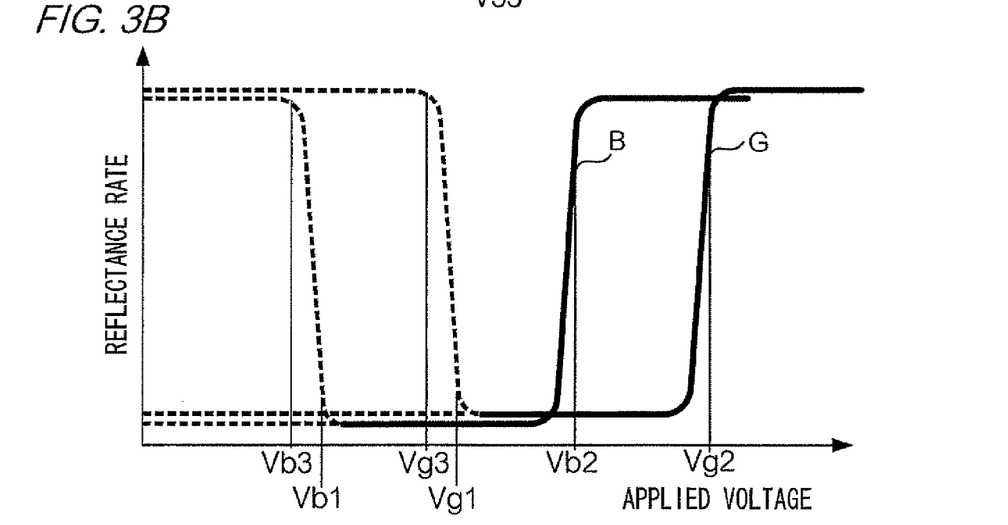

FIGS. 3A and 3B are diagrams showing a relation between a voltage applied via a conductive layer and a photosensitive layer and a light reflectance ratio of a display layer. Curved line R of FIG. 3A shows a relation between an applied voltage and a light reflectance ratio of display layer 204R. Curved line G of FIG. 3B shows a relation between an applied voltage and a light reflectance ratio of display layer 204G. Curved line B of FIG. 3B shows a relation between an applied voltage and a light reflectance ratio of display layer 204B.

If it is assumed that in display layer 204B, a threshold value of a voltage for change from a planar phase or a focal conic phase to a focal conic phase is Vb1, and a threshold value of a voltage for change from a focal conic phase to a homeotropic phase is Vb2; if a voltage applied via a conductive layer and a photosensitive layer before the application of the voltage is stopped is equal to or more than Vb2, the cholesteric liquid crystal enters a planar phase after the application of the voltage is stopped, to reflect blue light of outside light.

On the other hand, if a voltage applied via a conductive layer and a photosensitive layer before the application of the voltage is between Vb1 and Vb2, the cholesteric liquid crystal enters a focal conic phase after the application of the voltage is stopped, to transmit outside light.

Alternatively, if it is assumed that in display layer 204G, a threshold value of a voltage for change from a planar phase or a focal conic phase to a focal conic phase is Vg1, and a threshold value of a voltage for change from a focal conic phase to a homeotropic phase is Vg2, if a voltage applied via a conductive layer and a photosensitive layer before the application of the voltage is stopped is equal to or more than Vg2, the cholesteric liquid crystal enters a planar phase after the application of the voltage is stopped, to reflect blue green light of outside light.

On the other hand, if a voltage applied via a conductive layer and a photosensitive layer before the application of the voltage is between Vg1 and Vg2, the cholesteric liquid crystal enters a focal conic phase after the application of the voltage is stopped, to transmit outside light.

Alternatively, if it is assumed that in display layer 204R, a threshold value of a voltage for change from a planar phase or a focal conic phase to a focal conic phase is Vr1, and a threshold value of a voltage for change from a focal conic phase to a homeotropic phase is Vr2; if a voltage applied via a conductive layer and a photosensitive layer before the application of the voltage is stopped is equal to or more than Vr2, cholesteric liquid crystal enters a planar phase after the application of the voltage is stopped, to reflect red light of outside light.

On the other hand, if a voltage applied via a conductive layer and a photosensitive layer before the application of the voltage is between Vr1 and Vr2, the cholesteric liquid crystal enters a focal conic phase after the application of the voltage is stopped, to transmit outside light.

As described in the foregoing, if a voltage applied to a cholesteric liquid crystal of each display layer exceeds a threshold value of a voltage for a change from a planar phase (or a focal conic phase) to a focal conic phase (first threshold value (Vr1, Vg1, and Vb1), a voltage at the point where a reflectance rate of a display layer is 10 percent changes to a focal conic phase; and if an applied voltage exceeds a threshold value of a voltage for change from a focal conic phase to a homeotropic phase (second threshold value (Vr2, Vg2, and Vb2), a voltage at the point where a reflectance rate of a display phase is 90 percent changes to a homeotropic phase.

Figure 4:
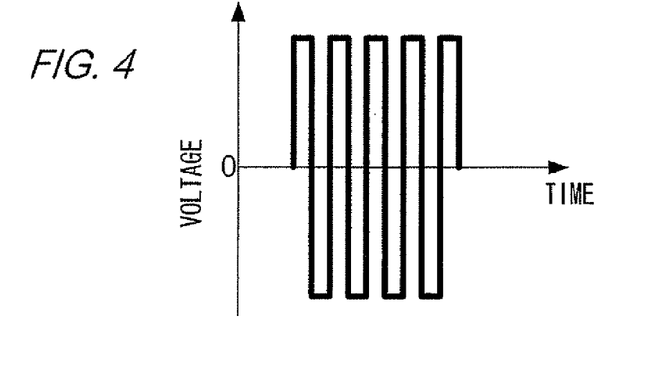
FIG. 4 is a diagram showing a waveform of a signal applied to a conductive layer.

In relation to FIG. 4 it is to be noted that if a voltage is applied to a display layer by providing a pulsed signal (hereinafter, referred to as pulse signal) to a conductive layer, a type and amount of a material for display layers 204B and 204G are selected to adjust electrical resistance components and electrical capacitance of display layers so that if the frequency of a pulse signal applied from conductive layers 202A and 202B changes, a first threshold value and a second threshold value change depending on the frequency of the applied pulse signal.

Figure 5A:
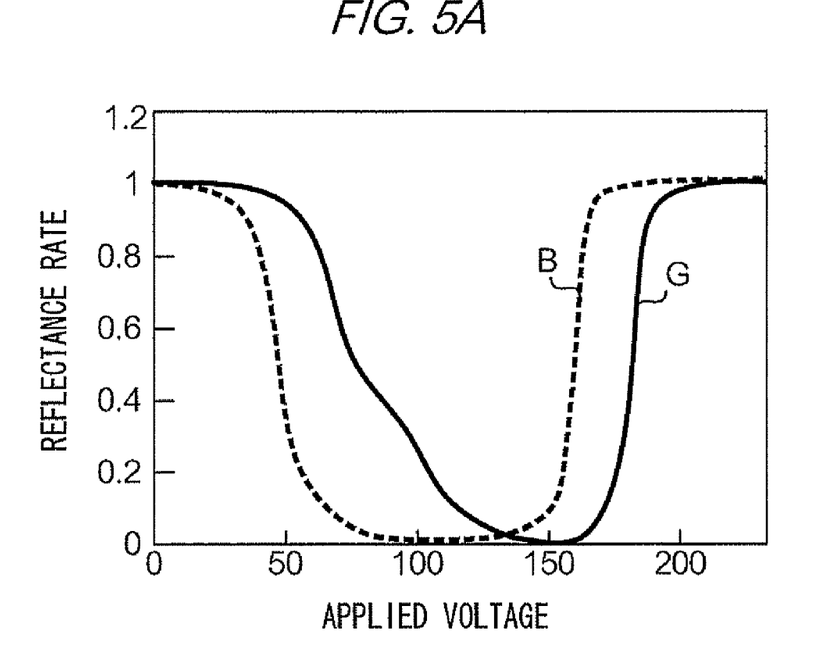
FIGS. 5A and 5B are diagrams showing a relation between a voltage applied to a display layer and a reflectance ratio of the display layer.

FIG. 5A is a diagram showing a relation between reflectance rates of display layers 204B and 204G and a voltage applied to the display layers. The measurement result of FIG. 5A is obtained by picking out display layers 204B and 204G from the configuration of FIG. 2, sandwiching each display layer between a pair of conductive layers, serially connecting the resultant stacks, and applying a pulse signal having a frequency of 100 Hz to the display layers.

Figure 5B:
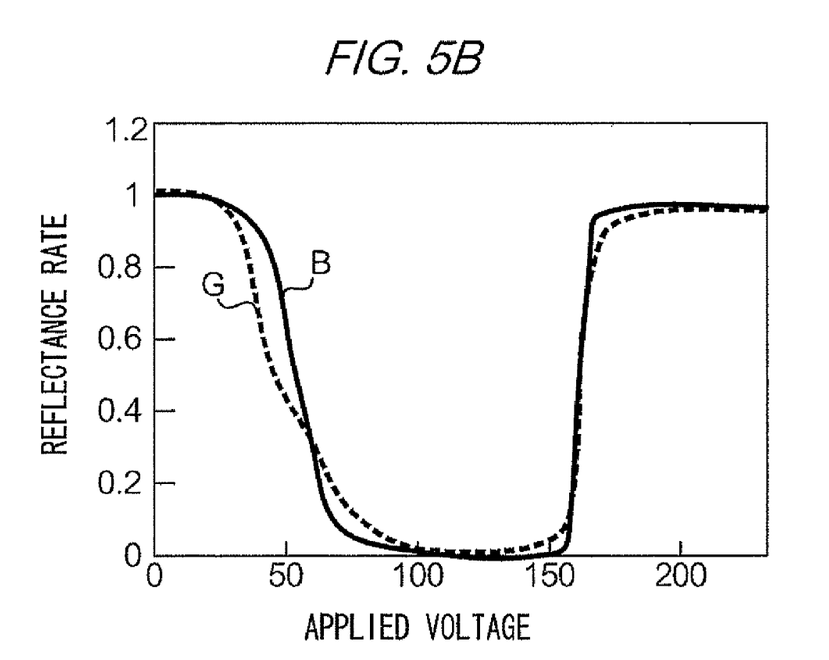

FIG. 5B is a diagram showing a relation between reflectance rates of display layers 204B and 204G shown in FIG. 2 and a voltage applied to the display layers. The measurement result of FIG. 5A is obtained by picking out display layers 204B and 204G from the configuration of FIG. 2, sandwiching each display layer between a pair of conductive layers, serially connecting the resultant stacks, and applying a pulse signal having a frequency of 5 Hz to the display layers.

The reflectance rates of FIGS. 5A and 5B are normalized.

If a voltage is applied to the above-mentioned display layers, a divided voltage provided to each display layer is identical to that provided to each display layer included in the stack shown in FIG. 2. The reason that display layers are picked out to measure reflectance rates of the layers is that if display layers are stacked as shown in FIG. 2, it is not possible to separately measure a change in a reflectance rate of each display layer.

Comparing FIG. 5A and FIG. 5B, it is found that a difference between first threshold values of display layer 204B and display layer 204G becomes smaller as the frequency of a pulse signal changes from 100 Hz to 5 Hz, and the difference becomes larger as the frequency of a pulse signal changes from 5 Hz to 100 Hz.

In view of the foregoing result of analysis, it is found that if the frequency of a pulse signal applied to conductive layers 202A and 202B is increased, orientational states of parts of display layers 204B and 204G at the same position can be differentiated in the configuration of FIG. 2, and if the frequency of a pulse signal is decreased, orientational states of parts of display layers 204B and 204G at the same position can be simultaneously changed in the configuration of FIG. 2.

Figure 6:
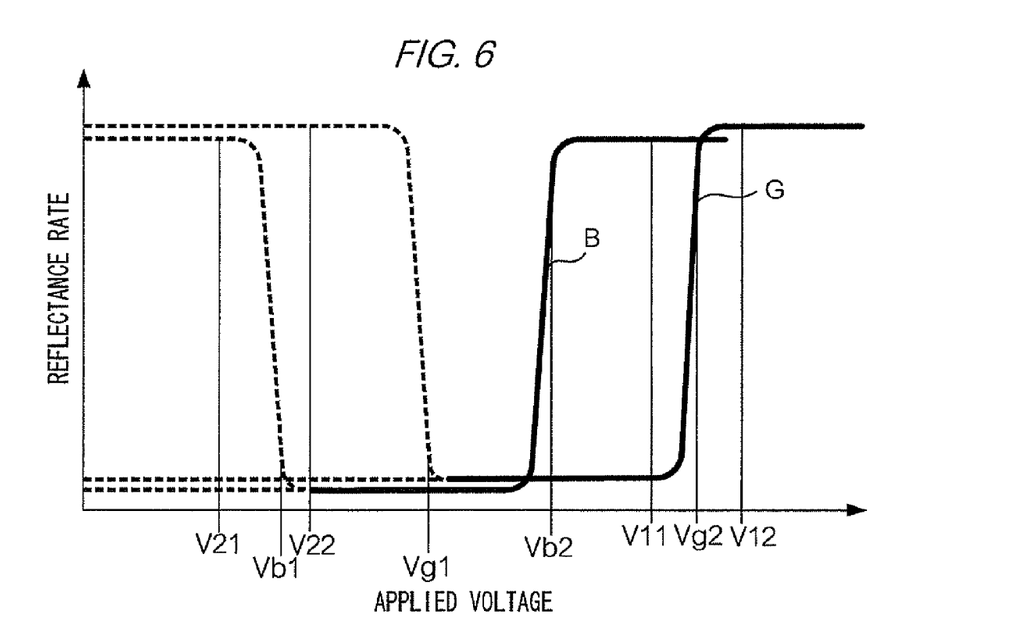
FIG. 6 is a diagram showing a relation between a voltage applied to a display layer and a reflectance ratio of the display layer.

Specifically, while no light is irradiated to a photosensitive layer, if the frequency of an applied pulse signal is 100 Hz in the configuration shown in FIG. 2, and voltage V11 shown in FIG. 6 is applied via conductive layers 202A and 202B by the pulse signal, an orientational state of display layer 204B changes to a homeotropic phase, and an orientational state of display layer 204G changes to a focal conic phase.

If blue light is irradiated to a part of display layer 204G that is to be reflective against green light, from the irradiated side, resistance of photosensitive layer 205R decreases, and a voltage applied to the irradiated part increases to voltage V12 (Vg2<V12). In this condition, if the application of the pulse signal is stopped, an orientational state of a part of display layer 204G that is not irradiated changes to a focal conic phase, and the irradiated part of display layer 204G changes to a planar phase. On the other hand, if the application of the pulse signal is stopped, an orientational state of the entire display layer 204B changes to a planar phase, since an orientational state of display layer 204B prior to the stoppage of the application of the pulse signal is a homeotropic phase.

Subsequently, if voltage V21 shown in FIG. 6 is applied via conductive layers 202A and 202B by a pulse signal, while no light is irradiated to a photosensitive layer, display layer 204G retains the above orientational state, and an orientational state of display layer 204B remains a planar phase.

In this condition, if blue light is irradiated to a part of display layer 204B that is transmissive to blue light, from the irradiated side, resistance of photosensitive layer 205R decreases, and a voltage applied to the irradiated part increases to voltage V22 (Vb1<V22<Vg1). As a result, an orientational state of a part of display layer 204B that is not irradiated changes to a planar phase, and the irradiated part of display layer 204B changes to a focal conic phase.

Figure 7:
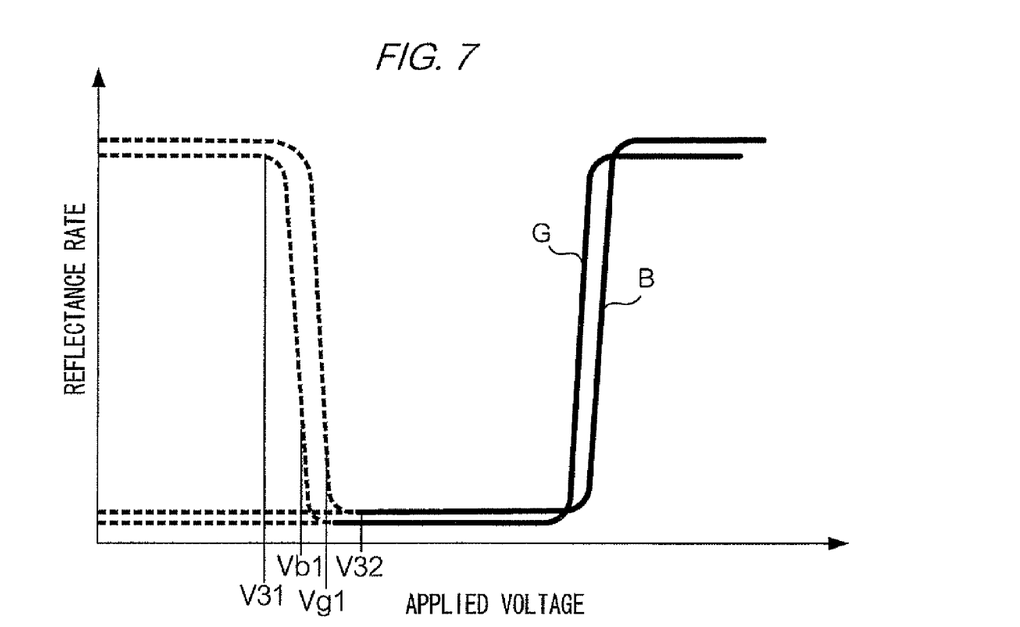
FIG. 7 is a diagram showing a relation between a voltage applied to a display layer and a reflectance ratio of the display layer.

Subsequently, while no light is irradiated to a photosensitive layer, if the frequency of the pulse signal is changed to 5 Hz in the configuration of FIG. 2, and a voltage of V31 is applied via conductive layers 202A and 202B by the pulse signal, display layers 204B and 204G retain the above orientational states. FIG. 7 shows a relation between a voltage applied via conductive layers and reflectance rates of display layers 204B and 204G.

In this condition, if blue light is irradiated to parts of display layers 204B and 204G that are transmissive to light, from the irradiated side, resistance of photosensitive layer 205R decreases, and a voltage applied to the irradiated parts increases to voltage V32 (Vg1<V32). As a result, orientational states of the irradiated parts in both display layers 204B and 204G simultaneously change to a focal conic phase. On the other hand, orientational states of parts of display layers 204B and 204G, which are not irradiated, are a planar phase.

Figure 8:
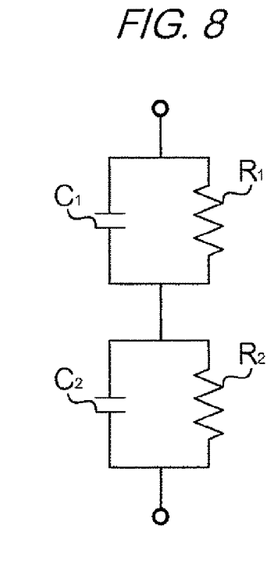
FIG. 8 is a diagram showing an equivalent circuit of display layers 204B and 204G.

FIG. 8 is a diagram showing an equivalent circuit of display layers 204B and 204G. In the drawing, $C_1$ shows capacitance of display layer 204B, and $C_2$ shows capacitance of display layer 204G. $R_1$ shows resistance of display layer 204B, and $R_2$ shows resistance of display layer 204G.

If an AC pulse signal is applied to the equivalent circuit, effective voltage $V_{rms}$ of a voltage divided by display layer 204B is expressed by the following formula.

$$Vrms = \{\tau \cdot \Delta V^2/2t_0(1-e^{-2t_0/\tau}) + 2\tau \cdot \Delta V \cdot V_{R\infty}/t_0(1-e^{-t_0/\tau}) + (V_{R\infty})^2\}^{1/2}$$

Each term of the formula is expressed by the following formulas. In the following formulas, f indicates a frequency of a pulse signal, and $V_0$ indicates a voltage applied.

$$\Delta V = V_c - V_{R\infty}$$

$$V_C = 2V_{c0} - (1-e^{-t_0/\tau}) \cdot V_{R\infty}/(1+e^{-t_0/\tau})$$

$$t_0 = 1/2f$$

$$\tau = R_1 R_2/(R_1+R_2) \cdot (C_1+C_2)$$

$$V_{c0} = V_0 \cdot C_2/(C_1+C_2)$$

$$V_{R\infty} = V_0 \cdot R_1/(R_1+R_2)$$

Figure 9:
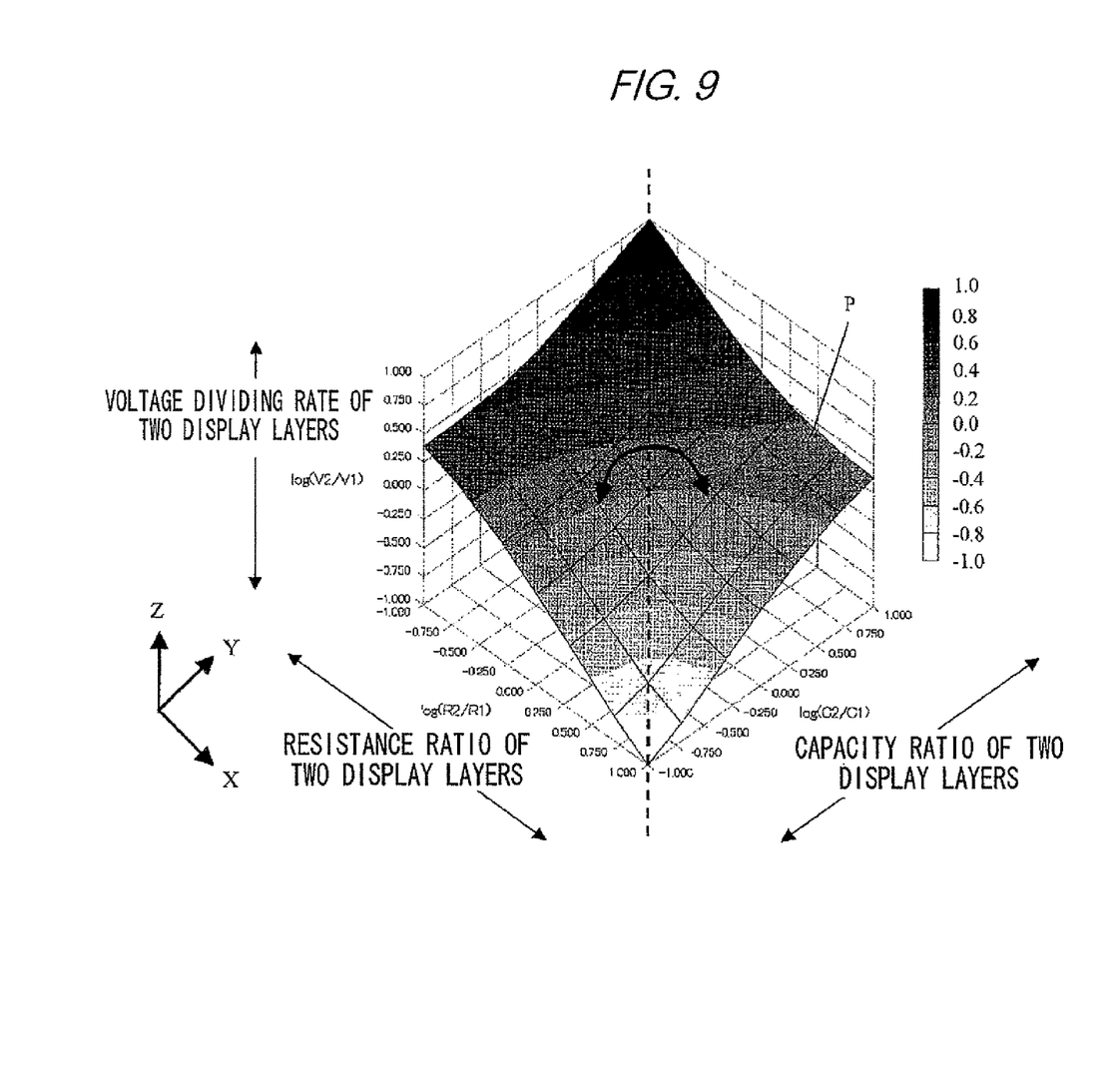
FIG. 9 is a diagram showing a relation between an impedance ratio and a partial pressure ratio of a display layer.
Figure 10A:
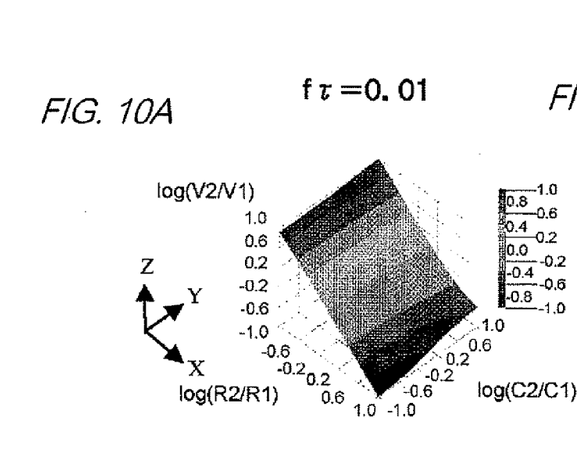
FIGS. 10A to 10E are diagrams showing a relation between an impedance ratio and a partial pressure ratio of a display layer.
Figure 10B:
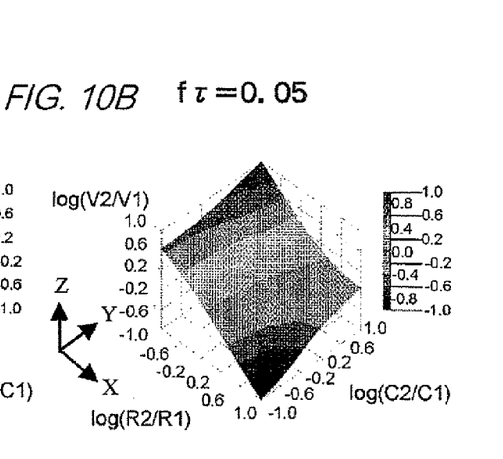
Figure 10C:
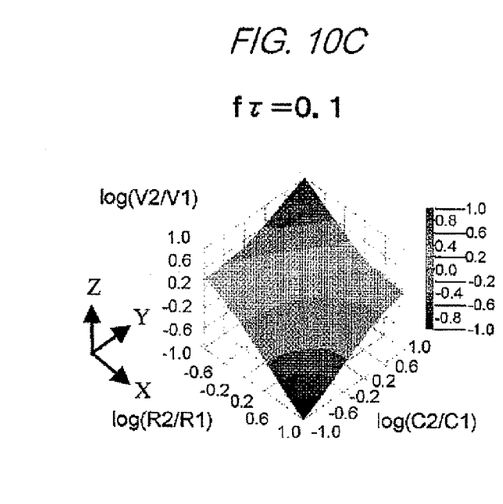
Figure 10D:
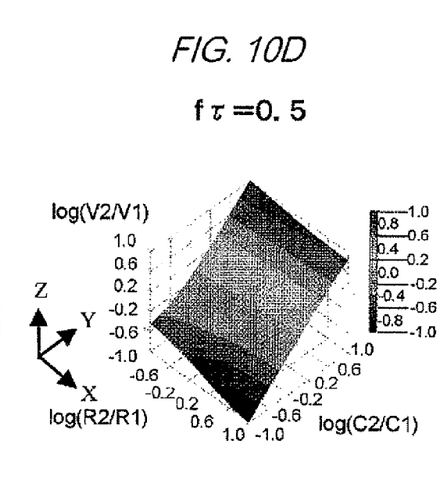
Figure 10E:
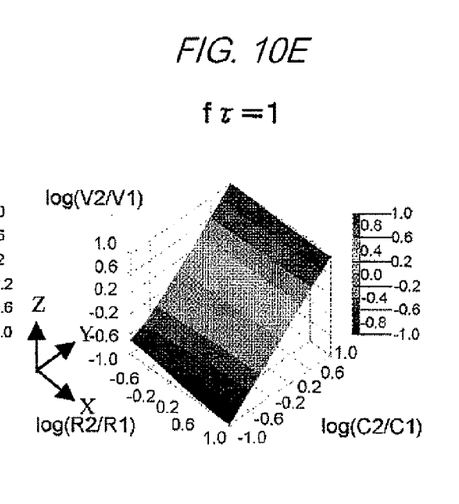

If a simulation of an impedance ratio and a voltage division ratio of display layers 204B and 204G are carried out using the above formulas, a result shown in FIG. 9 is obtained.

FIG. 9 shows an example of a result of the simulation, in which the X-axis is a scale of a resistance ratio of the two display layers, the Y-axis is a scale of a capacity ratio of the two display layers, and the Z-axis is a scale of a voltage division ratio of the two display layers. In FIG. 9, the dotted line shows an impedance matching axis (points at which the waveform of an applied voltage is not distorted). Surface P shows voltage division ratios measured when a pulse signal is applied, and rotates depending on f τ (a frequency that has been made dimensionless using a ratio to a time constant), as shown in FIGS. 10A to 10E.

Figure 11A:
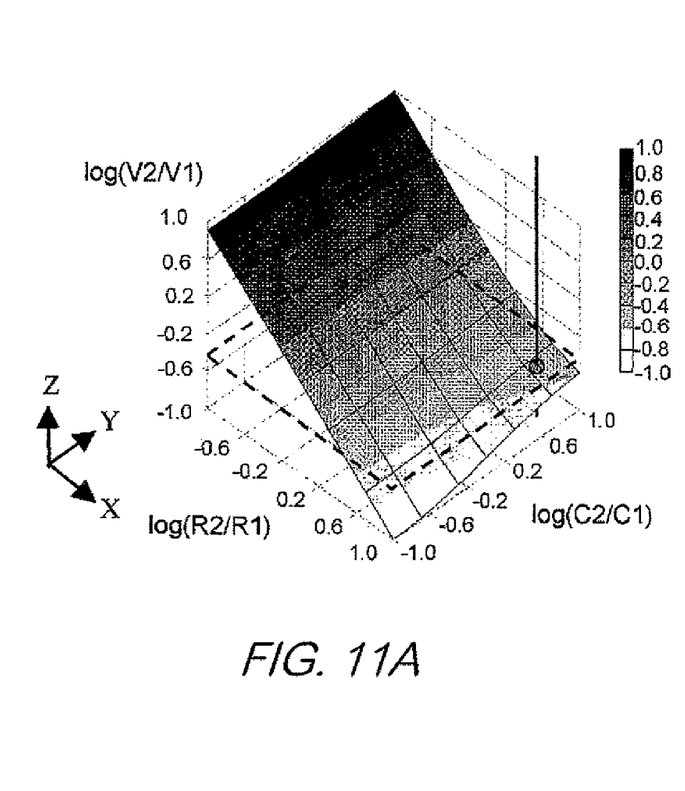
FIGS. 11A and 11B are diagrams showing a relation between an impedance ratio and a partial pressure ratio of a display layer.
Figure 11B:
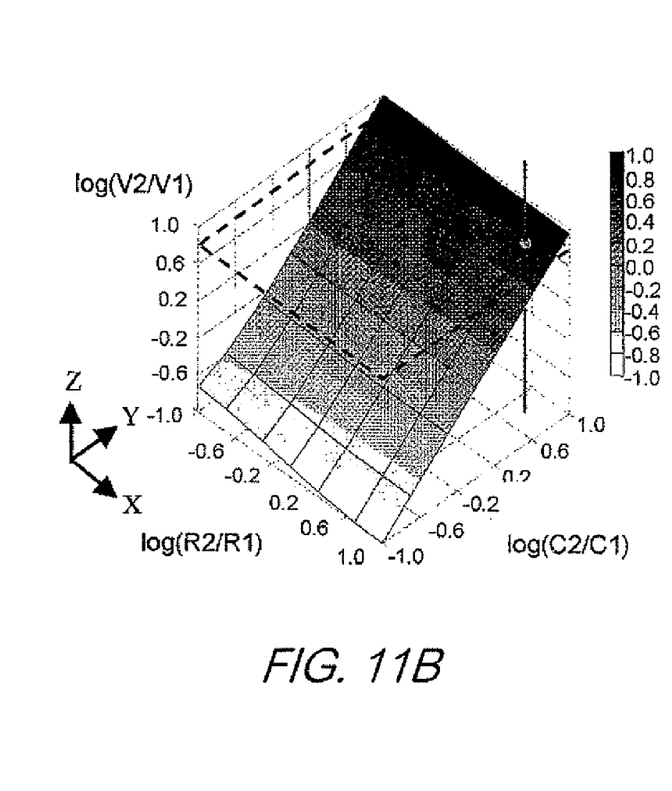

When a frequency of a pulse signal provided to conductive layers is determined, a perpendicular line is drawn from a point corresponding to a ratio of C1 and C2 of display layers and to a ratio of R1 and R2 of the display layers, as shown in FIGS. 11A and 11B. If a frequency for simultaneously changing orientational states of both display layers 204B and 204G is determined, voltage division ratios satisfying a relation that V2/V1 is nearly equal to Vpf2/Vpf1 (Voltage division ratios indicated by the dotted line in FIG. 11A) are obtained. Vpf2 represents a voltage causing display layer 204B to have a reflectance ratio of 10 percent, and Vpf1 represents a voltage causing display layer 204G to have a reflectance ratio of 10 percent. Vpf2/Vpf1 represents a ratio of Vpf2 and Vpf1. V2 represents a voltage divided and applied to display layer 204B, and V1 represents a voltage divided and applied to display layer 204G. V2/V1 represents a ratio of V2 and V1. After voltage division ratios are obtained, a frequency of surface P, that crosses the intersecting point of the voltage division ratios and the perpendicular line is obtained. The obtained frequency of surface P is used as a frequency of a pulse signal.

Alternatively, if a frequency of a pulse signal for differently changing orientational states of display layers 204B and 204G is determined, voltage division ratios satisfying a relation, V2/V1>Vpf2/Vpf1, (voltage division ratios indicated by the dotted line in FIG. 11B) are obtained. After voltage division ratios are obtained, a frequency of surface P, that crosses the intersecting point of the voltage division ratios and the perpendicular line is obtained. The obtained frequency of surface P is used as a frequency of a pulse signal.

(Configuration of Writing Device 1)

Figure 12:
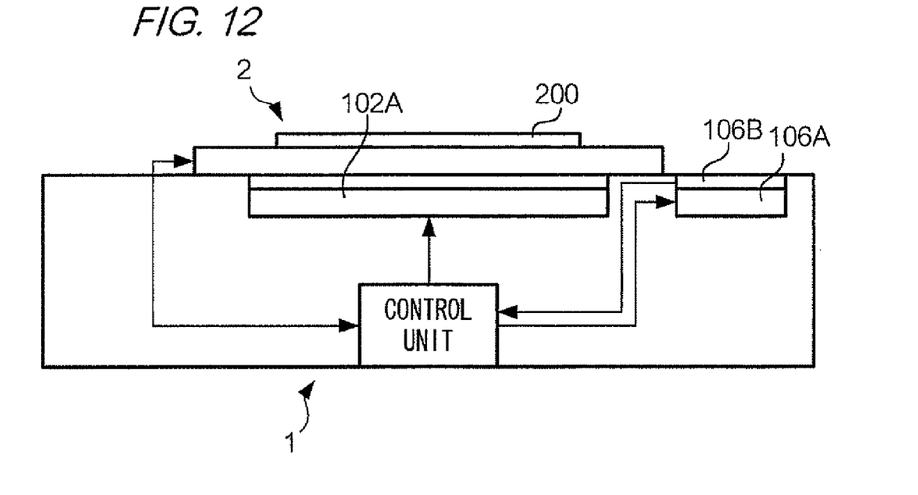
FIG. 12 is a diagram showing a frame format of an interior of writing device 1.
Figure 13:
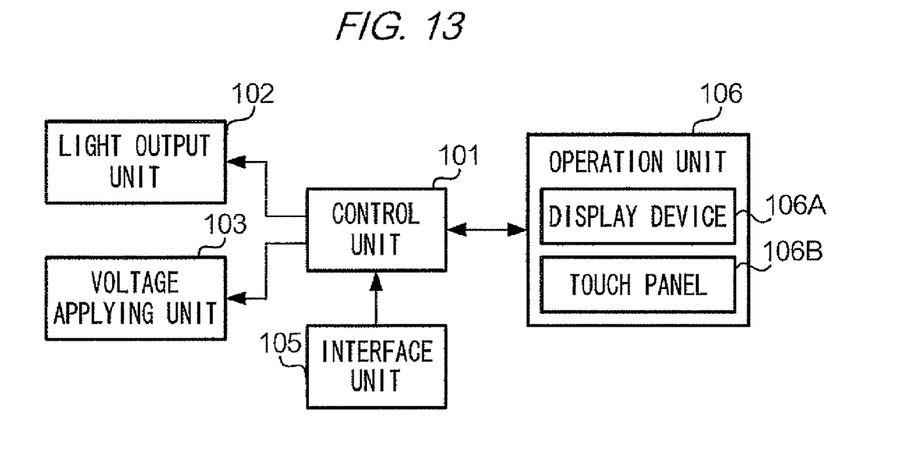
FIG. 13 is a block diagram showing a hardware configuration of writing device 1.

FIG. 12 is a diagram showing a frame format of an interior of writing device 1. FIG. 13 is a block diagram showing a hardware configuration of writing device 1.

Control unit 101 includes a microcomputer having a CPU, a ROM, a RAM, an input port, and an output port. The ROM stores a control program for controlling components of writing device 1, and if the control program is executed by the CPU, components of writing device 1 are controlled. Also, if the control program is executed, a function of controlling display medium 21 depending on a position of writing instrument 3, and causing display device 2 to display an image, is provided.

Voltage applying unit 103 has a terminal connected to terminal 203A, a terminal connected to terminal 203B, and a circuit for applying a pulse signal to conductive layers 202A and 202B via the terminals. Voltage applying unit 103 also has a terminal connected to terminal 203C and a terminal connected to terminal 203D, and applies a pulse signal to conductive layers 202C and 202D via the terminals. Voltage applying unit 103 is able to change the frequency of a pulse signal.

Interface unit 105 has a terminal connected to terminal 200A, for receiving a signal from touch panel 200. Interface unit 105 provides a signal output from touch panel 200, to control unit 101. Interface unit 105 also has a terminal to which a card-type memory card employing a flash memory as a storage medium is attached. Interface unit 105 retrieves data from a memory card inserted into slot 11 provided in writing device 1.

Operation unit 106 has display device 106A (e.g., a liquid crystal display or an organic EL (Electro Luminescence) display) on a surface of which transparent touch panel 106B is provided. Display device 106A displays an image for operating writing device 1, under control of control unit 101. Touch panel 106B outputs a signal indicating a position touched by a user to control unit 101.

Light outputting unit 102 has liquid crystal display 102A, which has a transmissive liquid crystal panel including pixels of three colors, red, green, and blue, and a backlight serving as a light source. Light outputted from the backlight transmits the liquid crystal panel, and is irradiated to the irradiated side of display device 2 fixed on the liquid crystal panel. In light outputting unit 102, pixels outputting light are controlled by control unit 101.

In the present exemplary embodiment, control unit 101 pre-stores data on positions on touch panel 200 and corresponding positions of pixels of liquid crystal display 102A, which output light, in association with each other. In response to a positional signal from touch panel 200, control unit 101 identifies a position of a pixel corresponding to a position indicated by the positional signal, and causes liquid crystal display 102A to output light from the identified pixel. Accordingly, it is necessary to fix display device 2 at a predetermined position on writing device 1, when display device 2 and writing device 1 are electrically connected.

(Operation of Exemplary Embodiment)

Now, an operation of the present exemplary embodiment will be described. Specifically, an operation for causing display medium 21 to display an image, using writing instrument 3 is described.

Initially, display device 2 is fixed on a predetermined position of writing device 1, as shown in FIGS. 1 and 12, by a user. Terminals of voltage applying unit 103 and terminals 203A to 203D are electrically connected. Interface unit 105 and terminal 200A are connected. As a result, it is possible to apply a voltage to conductive layers 202A to 202D from writing device 1 via terminals 203A to 203D. It is also possible that control unit 101 receives a signal output from touch panel 200.

Figure 14:
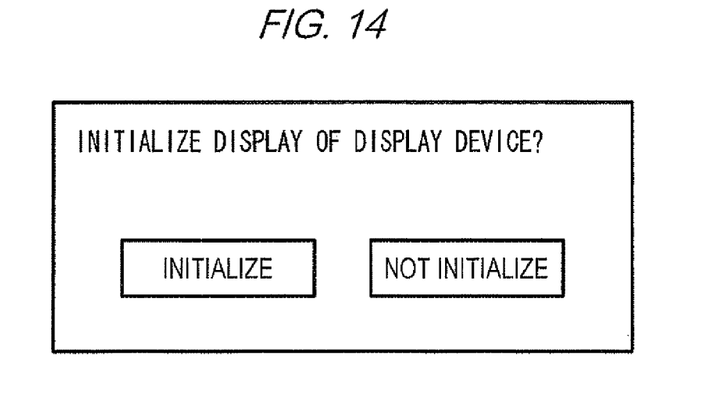
FIG. 14 is a diagram showing an example of a screen displayed on display device 106A.

When writing device 1 is electrically connected with display device 2, writing device 1 causes display device 106A to display a screen shown in FIG. 14. After the screen is displayed, if a user of writing device 1 touches an area of touch panel 106B, that displays a message "Initialize," control unit 101 causes voltage applying unit 103 and light outputting unit 102 to place an orientational state of cholesteric liquid crystal of each display layer into a planar phase.

Specifically, control unit 101 causes liquid crystal display 102A to turn off its backlight. Subsequently, voltage applying unit 103 applies a pulse signal shown in FIG. 4 to terminals 203A and 203B. The frequency of the pulse signal is 100 [Hz], and an applied voltage is set to a voltage equal to or higher than Vg2. As a result, orientational states of display layers 204B and 204G change to a homeotropic phase. After orientational states change to a homeotropic phase, the application of the pulse signal is stopped. As a result, orientational states of display layers 204B and 204G change to a planar phase so that display layer 204B reflects light of a blue wavelength of outside light, and display layer 204G reflects light of a green wavelength of outside light.

Voltage applying unit 103 again applies a pulse signal to terminals 203C and 203D. A voltage applied by the pulse signal is set to a voltage equal to or higher than Vr2. As a result, an orientational state of display layer 204R changes to a homeotropic phase. After an orientational state changes to a homeotropic phase, the application of the pulse signal is stopped. As a result, an orientational state of display layer 204R changes to a planar phase so that display layer 204R reflects light of a red wavelength of outside light.

After the operation of placing an orientational state of cholesteric liquid crystal of each display layer into a planar phase is completed, writing device 1 stops voltage-applying unit 103 from applying a voltage to terminals 203A to 203D.

After that, if a memory card storing image data representing an image is inserted into slot 11 to be attached to interface unit 105, control unit 101 detects the insertion of the memory card, and causes display device 106A to display a file name of the image data stored in the memory card.

After the file name is displayed, if a user of writing device 1 operates touch panel 106B to select the displayed file name, the image data whose file name was selected is retrieved from the memory card, and the image represented by the image data is displayed on display device 106A.

In this condition, if an operation is made using touch panel 106B on display device 2, for displaying the image displayed on display device 106, the following operation is carried out.

Writing device 1 controls light outputting unit 102 and voltage applying unit 103 on the basis of the image represented by the image data selected by a user. The image represented by the image data is a color image of three colors: red, green, and blue.

Specifically, voltage-applying unit 103 applies a pulse signal having the frequency of 100 [Hz] and applying voltage V11, to conductive layers 202A and 202B. As a result, an orientational state of display layer 204B changes to a homeotropic phase, and an orientational state of display layer 204G changes to a focal conic phase.

When the pulse signal is applied, light-outputting unit 102 is controlled on the basis of a green image constituting the image represented by the image data so that blue light is irradiated to a part of display device 21 that reflects green light, from liquid crystal display 102A. As a result, resistance of photosensitive layer 205R decreases, and a voltage applied to the irradiated part increases to voltage V12 (Vg2<V12). In this condition, if application of the pulse signal is stopped, an orientational state of a part of display layer 204G, which is not irradiated, changes to a focal conic phase, and an orientational state of the irradiated part changes to a planar phase.

Subsequently, voltage-applying unit 103 applies a pulse signal having the frequency of 100 [Hz] and applying voltage V21, to conductive layers 202A and 202B. As a result, display layer 204G retains the above orientational state, and display layer 204B remains in a planar state.

When the pulse signal is applied, light-outputting unit 102 is controlled on the basis of a blue image constituting the image represented by the image data so that blue light is irradiated to a part of display device 21 to be transparent to blue light, from liquid crystal display 102A. As a result, resistance of photosensitive layer 205R decreases, and a voltage applied to the irradiated part increases to voltage V22 (Vb1<V22<Vg1). In this condition, if the application of the pulse signal is stopped, an orientational state of a part of display layer 204B, which is not irradiated, changes to a planar phase, and an orientational state of the irradiated part changes to a focal conic phase.

Subsequently, voltage-applying unit 103 applies a pulse signal applying voltage V33 (Vr1<V33<Vr2), to conductive layers 202C and 202D. As a result, an orientational state of display layer 204R changes to a focal conic phase.

When the pulse signal is applied, light outputting unit 102 is controlled on the basis of a red image constituting the image represented by the image data so that red light is irradiated to a part of display device 21 that reflects red light from liquid crystal display 102A. As a result, resistance of photosensitive layer 205BG decreases, and a voltage applied to the irradiated part increases to a voltage equal to or higher than voltage Vr2. In this condition, if the application of the pulse signal is stopped, an orientational state of a part of display layer 204R, which is not irradiated, changes to a focal conic phase, and an orientational state of the irradiated part changes to a planar phase.

In summary, orientational states of particular parts of each display layer are changed on the basis of image data, to generate areas reflecting outside light and areas transparent to outside light on display medium 21 so that an image represented by the image data can be seen on display device 2.

Figure 15:
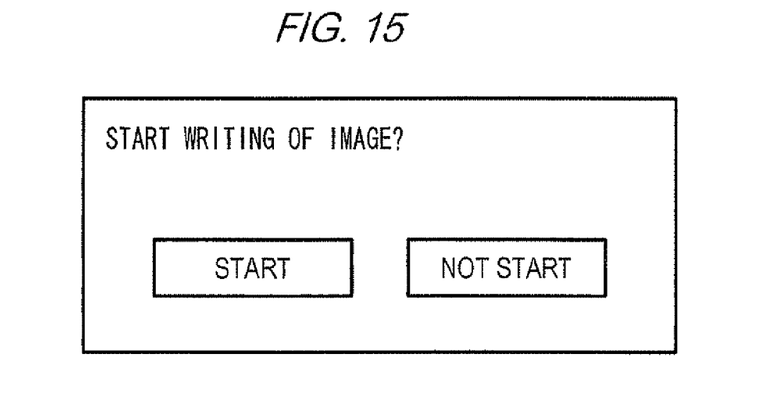
FIG. 15 is a diagram showing an example of a screen displayed on display device 106A.

After the operation of changing an orientational state of each display layer on the basis of the image represented by the image data is completed, writing device 1 stops voltage applying unit 103 from applying a voltage to terminals 203A to 203D, and causes display device 106A to display a screen for receiving an instruction from a user to start writing of an image, as shown in FIG. 15.

After the screen is displayed, if a user of writing device 1 touches an area of touch panel 106B displaying a message "Start," control unit 101 causes voltage applying unit 103 to apply a pulse signal having the frequency of 5 [Hz] to terminals 203A to 203D. A voltage applied via terminals 203A and 203B is set to voltage V31 shown in FIG. 7, and a voltage applied via terminals 203C and 203D is set to voltage Vr3 (see FIG. 3A), which is lower than voltage Vr1. Control unit 101 also sets liquid crystal display 102A to a state where no part of the surface outputs light.

Figure 16:
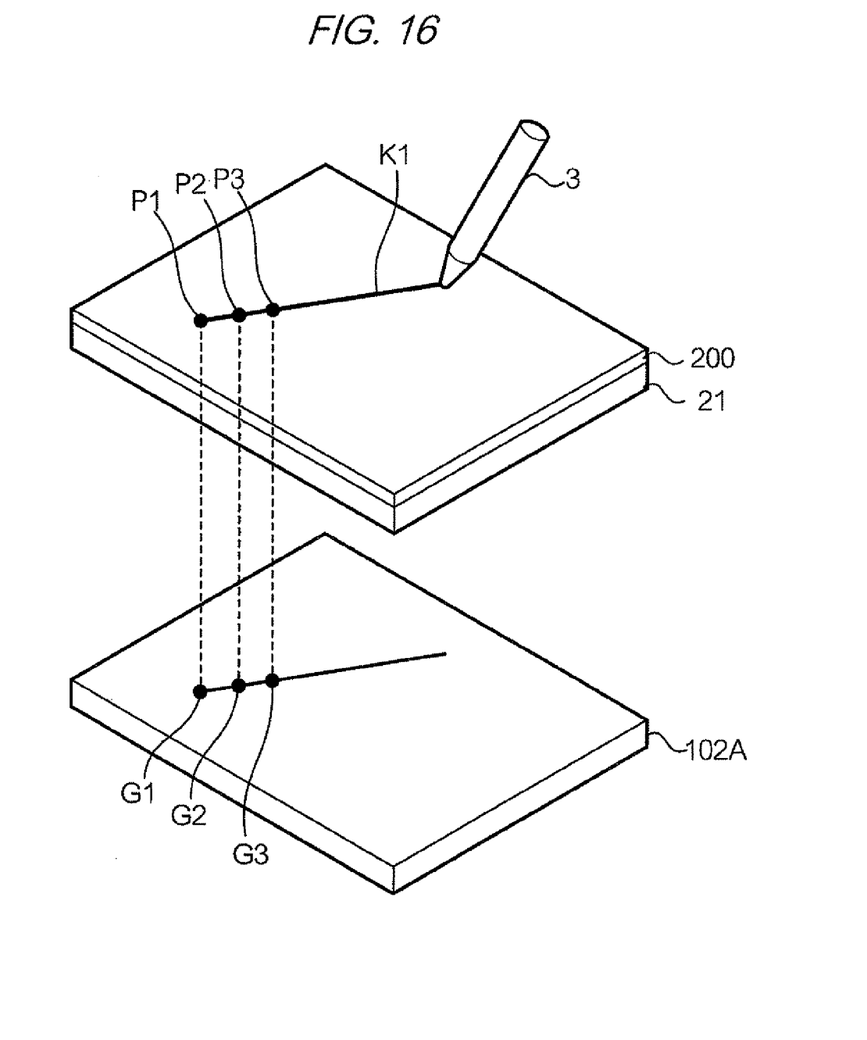
FIG. 16 is a diagram explaining an operation of an exemplary embodiment.

In this condition, if a user moves writing instrument 3 along route K1 shown in FIG. 16, while writing instrument 3 is in contact with touch panel 200, positional signals are output indicating a point of contact, and provided to control unit 101. Control unit 101 receiving the positional signals controls light-outputting unit 102 on the basis of the points of contact indicated by the positional signals.

For example, if a positional signal is provided to control unit 101, indicating a position of point P1 on route K1 of touch panel 200, control unit 101 identifies, on the basis of the positional signal, pixel G1 located under point P1 in liquid crystal display 102A, and causes liquid crystal display 102A to output blue and red light from only pixel G1.

The light output from the pixel of liquid crystal display 102A enters display medium 21 from the irradiated side. Of the light output from the pixel, red light causes a photoelectric effect in photosensitive layer 205BG. As a result, in an area of display layer 204R, located above the area of photosensitive layer 205BG, in which a photoelectric effect is caused, an applied voltage increases to a range from Vr1 to Vr2 so that an orientational state of cholesteric liquid crystal changes to a focal conic phase to be transparent to red light.

Of the light output from the pixel, blue light causes a photoelectric effect in photosensitive layer 205R. As a result, in areas of display layers 204B and 204G, located above the area of photosensitive layer 205R, in which a photoelectric effect is caused, an applied voltage increases to voltage V32.

Reflectance ratios of display layers 204B and 204G and a voltage applied via conductive layers 202A and 202B have a relation shown in FIG. 7. Since the first threshold values of display layers 204B and 204G are close to each other, orientational states of cholesteric liquid crystal of both display layers 204B and 204G change to a focal conic phase so that display layer 204B is transparent to blue light, and display layer 204G is transparent to green light.

As a result, in the area located under point P1 of display medium 21, blue and green light entering from the display surface side penetrates display layers 204B and 204G, and is absorbed by colored layer 206R. Red light entering from the display surface side penetrates display layers 204B, 204G, and 204R, and is absorbed by colored layer 206R. Namely, outside light reaching point P1 from the display surface side is not reflected in display medium 21; accordingly, the part located under point P1 (the part located under the point of contact with writing instrument 3) appears black to a user.

Subsequently, if writing instrument 3 is moved to point P2, and a positional signal indicating the position of point P2 is provided to control unit 101, control unit 101 identifies on the basis of the positional signal, pixel G2 located under point P2 in liquid crystal display 102A, and causes liquid crystal display 102A to output light from only pixel G2. As a result, an orientational state of liquid crystal located under point P2 changes, as in the case of point P1, so that the part located under point P2 appears black to a user.

After a user moves writing instrument 3 along route K1, and if the user detaches writing instrument 3 from touch panel 200, and operates touch panel 200 to make an instruction to end the writing of an image, the backlight of liquid crystal display 102A is turned off. At this moment, in the part corresponding to route K1 of display medium 21, an orientational state of cholesteric liquid crystal is in a focal conic phase as a result of the irradiation of light; accordingly, the part is seen as a black line.

As explained in the foregoing, the present exemplary embodiment has two patterns in which orientational states of plural display layers are changed. One is a pattern in which orientational states of plural display layers are individually changed, and the other is a pattern in which orientational states of plural display layers are simultaneously changed. In the pattern in which orientational states are simultaneously changed, an image is added.

Also, in a case where an AC voltage is applied to a dielectric substance such as a display layer described above; the lower a frequency of a voltage, the less power consumed. In the present exemplary embodiment, a voltage is applied for a longer time when an image is added using writing instrument 3 rather than when an image represented by image data is displayed; however, when an image is added using writing instrument 3, a frequency of a pulse signal is set to be lower than when an image represented by image data is displayed, so that less power is consumed.

[Modifications]

The present invention may be implemented as embodiments other than the above exemplary embodiment. For example, the above exemplary embodiment may be modified as described below. The following modifications may be combined with each other.

In the above exemplary embodiment, where display medium 21 includes colored layer 206R and colored layer 206BG, display medium 21 does not have to include the colored layers.

In the above exemplary embodiment, where light is irradiated to a writing surface of display medium 21 from liquid crystal display 102A of writing device 1, light may be irradiated from other components. For example, light-emitting diodes may be arranged over a surface of writing device 1, and a light-emitting diode may be caused to light up in response to a positional signal, to irradiate light to a writing surface of display medium 21. Alternatively, instead of liquid crystal display 102A, a display device may be used, using a substance that emits light in response to application of a voltage, such as an organic EL display. Alternatively, a black-and-white-type liquid crystal display may be used, including a backlight in which lights of three colors, red, green, and blue can be switched, as a light source, and pixels of two types; namely, one that transmits light and one that does not transmit light.

In the above exemplary embodiment, where the number of display layers is three, display medium 21 does not have to include display layer 204R.

Also, light reflected by a display layer may be, instead of the light described in the above exemplary embodiment, light of other wavelengths (or light of other colors).

In the above exemplary embodiment, where a touch panel is provided on a surface of display medium 2 to locate writing instrument 3, the touch panel may be provided at writing device 1, instead of display device 2.

If a touch panel is provided at writing device 1, the touch panel is provided over a surface of writing device 1, while being separated from liquid crystal display 102A, so that display device 2 can be inserted between the touch panel and liquid crystal display 102A. If a touch panel is so provided, light of liquid crystal display 102A is irradiated to a writing surface of display device 2, and writing instrument 3 is operated on a display surface of display device 2 to cause the device to display an image.

In the above exemplary embodiment, where a touch panel is used to locate writing instrument 3, writing instrument 3 may be located by using an electromagnetic induction method, instead of using a touch panel.

Alternatively, a tablet may be provided on writing device 1 so that writing instrument 3 is operated on the tablet, instead of a surface of display device 2, to control liquid crystal display 102A.

In the above exemplary embodiment, where writing instrument 3 is in the form of a pen, writing instrument 3 may be in other forms, instead of a pen, as long as the instrument can used in such as way as to be placed in contact with touch panel 200 to specify a pixel to emit light. Alternatively, instead of using writing instrument 3, a finger may be used to contact touch panel 200 to write an image.

In the present specification, a term "operation unit" is a broad and generic concept describing, in addition to writing instrument 3, a portion for specifying a part whose display is to be changed.

In the above exemplary embodiment, after a screen shown in FIG. 15 is displayed, and an area displaying a message "Start" is touched, writing of an image using writing instrument 3 is enabled; after an operation is completed for placing display layers 204R and 204BG in a planar phase, a message "Writing of image is enabled" may be displayed, and thereafter an operation may be carried out for receiving a positional signal and controlling liquid crystal display 102A.

Also, when an image is added using writing instrument 3; if writing instrument 3 is detached from touch panel 200 so that no signal is provided from touch panel 200 to control unit 101, a backlight of liquid crystal display 102A may be turned off. Conversely, if writing instrument 3 is caused to contact with touch panel 200 so that a signal is provided from touch panel 200 to control unit 101, a backlight of liquid crystal display 102A may be turned on.

In the above exemplary embodiment, where an image is added using writing instrument 3 after an image represented by image data is displayed, an image may be added using writing instrument 3, even if an image represented by image data is not displayed, after display medium 21 is initialized so that each display layer is placed in a planar phase.

Also, in the above exemplary embodiment, where each display layer is placed in a planar phase when display medium 21 is initialized, each display layer may be placed in a focal conic phase, and when an image is added using writing instrument 3, voltage-applying unit 103 and liquid crystal display 102A may be controlled so that a part of a display layer corresponding to a point of contact with writing instrument 3 is placed in a planar phase. In this case, a colored character or drawing is defined against a black background.

Figure 17:
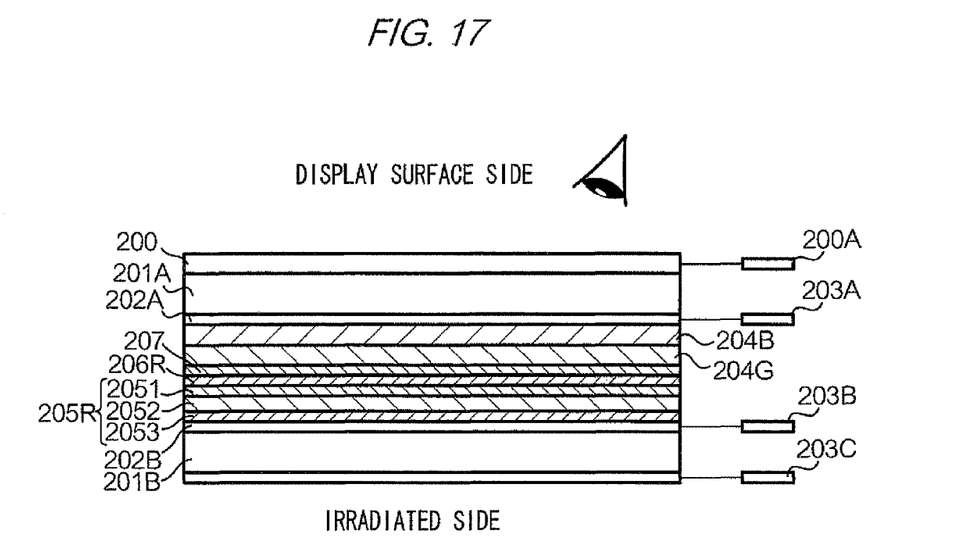
FIG. 17 is a diagram showing a frame format of a section of display medium 21 according to a modification of the present invention.

In the above exemplary embodiment, where display medium 21 includes three display layers, two photosensitive layers, and four conductive layers, display medium 21 may include two displays, a photosensitive layer, and two conductive layers, as shown in FIG. 17. In FIG. 17, components shared with those of FIG. 2 are denoted with like numerals.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A writing device comprising:
    a display medium comprising:
        a first display layer in which if a pulse voltage is applied to a part of the first display layer, a state of the part changes to a reflective state in which the part reflects light of a first wavelength of outside light or a light transmissive state in which the part transmits light of the first wavelength of outside light, depending on a value of the pulse voltage;

a second display layer stacked on the first display layer, in which if a pulse voltage is applied to a part of the second display layer, a state of the part changes to a reflective state in which the part reflects light of a second wavelength, which is different from the first wavelength, of outside light or a light transmissive state in which the part transmits light of the second wavelength of outside light, depending on a value of the pulse voltage;

a first conductive layer and a second conductive layer sandwiching the first display layer and the second display layer, to which bias voltage is applied from outside; and a photosensitive layer located between the first conductive layer and the second conductive layer such that upon irradiation of the photosensitive layer with light a value of a pulse voltage applied to the first display layer and the second display layer increases, wherein:

a value of a pulse voltage for changing a state of the first display layer is different from a value of a pulse voltage for changing a state of the second display layer;

a ratio of a pulse voltage applied to the first display layer via the first conductive layer and the second conductive layer and a pulse voltage applied to the second display layer via the first conductive layer and the second conductive layer changes depending a frequency of a bias voltage applied to the first conductive layer and the second conductive layer; and a value of a pulse voltage for changing a state of the first display layer and a value of a pulse voltage for changing a state of the second display layer change depending on a frequency of a bias voltage applied to the first conductive layer and the second conductive layer;

a voltage-applying unit that applies a bias voltage to the first conductive layer and the second conductive layer, a frequency of the bias voltage differing between a case in which a state of the first display layer and a state of the second display layer are changed simultaneously, and a case in which a state of the first display layer and a state of the second display layer are changed separately; and a light outputting unit that irradiates light to the display medium.

2. The writing device according to claim 1, wherein a frequency of a bias voltage applied to the first conductive layer and the second conductive layer is lower in a case in which a state of the first display layer and the second display layer are changed simultaneously than a case in which a state of the first display layer and a state of the second display layer are changed separately.

3. The writing device according to claim 2, wherein a difference between the value of a pulse voltage for changing a state of the first display layer and the value of a pulse voltage for changing a state of the second display layer is: in a case where a state of the first display layer and a state of the second display layer are changed simultaneously, smaller than an amount of a pulse voltage by which the photosensitive layer irradiated by light increases a value of a pulse signal applied to the first display layer and the second display layer, and in a case where a state of the first display layer and a state of the second display layer are changed separately, larger than an amount of a pulse voltage by which the photosensitive layer irradiated by light increases a value of a pulse signal applied to the first display layer and the second display layer.

4. The writing device according to claim 1, wherein the display medium further comprises:

a third display layer in which if a pulse voltage is applied to a part of the third display layer, a state of the part changes to a reflective state in which the reflective part reflects light of a third wavelength, which is different from the first wavelength and the second wavelength, of outside light, or changes to a light transmissive state in which the light transmissive part transmits light of the third wavelength of outside light, depending on a value of the pulse voltage;

a third and a fourth conductive layers sandwiching the third display layer, to which a bias voltage is applied from outside, for changing a state of the third display layer; and a photosensitive layer located between the third conductive layer and the fourth conductive layer, that if irradiated with light, increases a value of a pulse signal applied to the third display layer.

5. The writing device according to claim 2, wherein the display medium further comprises:

a third display layer in which if a pulse voltage is applied to a part of the third display layer, a state of the part changes to a reflective state in which the reflective part reflects light of a third wavelength, which is different from the first wavelength and the second wavelength, of outside light, or changes to a light transmissive state in which the light transmissive part transmits light of the third wavelength of outside light, depending on a value of the pulse voltage;

a third and a fourth conductive layers sandwiching the third display layer, to which a bias voltage is applied from outside, for changing a state of the third display layer; and a photosensitive layer located between the third conductive layer and the fourth conductive layer, that if irradiated with light, increases a value of a pulse signal applied to the third display layer.

6. The writing device according to claim 3, wherein the display medium further comprises:

a third display layer in which if a pulse voltage is applied to a part of the third display layer, a state of the part changes to a reflective state in which the reflective part reflects light of a third wavelength, which is different from the first wavelength and the second wavelength, of outside light, or changes to a light transmissive state in which the light transmissive part transmits light of the third wavelength of outside light, depending on a value of the pulse voltage;

a third and a fourth conductive layers sandwiching the third display layer, to which a bias voltage is applied from outside, for changing a state of the third display layer; and a photosensitive layer located between the third conductive layer and the fourth conductive layer, that if irradiated with light, increases a value of a pulse signal applied to the third display layer.

7. A writing device comprising:

a display medium comprising:

a first display layer in which if a pulse voltage is applied to a part of the first display layer, a state of the part changes to a reflective state in which the part reflects light of a first wavelength of outside light or a light transmissive state in which the part transmits light of the first wavelength of outside light, depending on a value of the pulse voltage;

a second display layer stacked on the first display layer, in which if a pulse voltage is applied to a part of the second display layer, a state of the part changes to a reflective state in which the part reflects light of a second wavelength, which is different from the first wavelength, of outside light or a light transmissive state in which the part transmits light of the second wavelength of outside light, depending on a value of the pulse voltage;

a first conductive layer and a second conductive layer sandwiching the first display layer and the second display layer, to which a bias voltage is applied from outside; and a photosensitive layer located between the first conductive layer and the second conductive layer such that upon irradiation of the photosensitive layer with light a value of a pulse voltage applied to the first display layer and the second display layer increases, wherein:

a value of a pulse voltage for changing a state of the first display layer is different from a value of a pulse voltage for changing a state of the second display layer;

a ratio of a pulse voltage applied to the first display layer via the first conductive layer and the second conductive layer and a pulse voltage applied to the second display layer via the first conductive layer and the second conductive layer changes depending a frequency of a bias voltage applied to the first conductive layer and the second conductive layer; and a value of a pulse voltage for changing a state of the first display layer and a value of a pulse voltage for changing a state of the second display layer change depending on a frequency of a bias voltage applied to the first conductive layer and the second conductive layer;

a voltage-applying means for applying a bias voltage to the first conductive layer and the second conductive layer, a frequency of the bias voltage differing between a case in which a state of the first display layer and a state of the second display layer are changed simultaneously, and a case in which a state of the first display layer and a state of the second display layer are changed separately; and a light outputting means for irradiating light to the display medium.

* * * * *